(12) United States Patent
Matsui

(10) Patent No.: US 9,748,750 B2
(45) Date of Patent: Aug. 29, 2017

(54) ELECTRICAL CONNECTION BOX

(71) Applicant: Sumitomo Wiring Systems, Ltd, Yokkaichi, Mie (JP)

(72) Inventor: Toshiyuki Matsui, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/173,689

(22) Filed: Jun. 5, 2016

(65) Prior Publication Data
US 2016/0359306 A1    Dec. 8, 2016

(30) Foreign Application Priority Data
Jun. 5, 2015    (JP) .................. 2015-114615

(51) Int. Cl.
*H02G 3/08* (2006.01)
*H02G 3/04* (2006.01)

(52) U.S. Cl.
CPC .......... *H02G 3/088* (2013.01); *H02G 3/0468* (2013.01); *H02G 3/083* (2013.01)

(58) Field of Classification Search
CPC .......... H02G 3/08; H02G 3/081; H02G 3/083; H02G 3/086; H02G 3/088; H05K 5/0247; H05K 5/0217; H05K 5/0004; H05K 5/0221

See application file for complete search history.

(56) References Cited

U.S. PATENT DOCUMENTS

2007/0014054 A1    1/2007  Zhang et al.

FOREIGN PATENT DOCUMENTS

JP    4405945 B2    11/2009

*Primary Examiner* — Hoa C Nguyen
*Assistant Examiner* — Amol Patel
(74) *Attorney, Agent, or Firm* — Dinsmore & Shohl LLP

(57) ABSTRACT

The present invention suppresses an increase in the number of components and simplifies an attachment task. An electrical connection box is configured such that multiple wire harnesses are connected thereto side-by-side vertically. The electrical connection box includes: a lower case having a lower placement portion on which a lower wire harness is to be placed; a harness support member having a lower holding portion that is latched to the lower placement portion and holds the lower wire harness, and having an upper placement portion on which an upper wire harness is to be placed; and an upper case that is mated to the lower case and has an upper holding portion that is latched to the upper placement portion and holds the upper wire harness.

3 Claims, 25 Drawing Sheets

ELECTRICAL CONNECTION BOX

CROSS-REFERENCE TO RELATED APPLICATIONS

This application claims priority of Japanese Patent Application No. JP2015-114615 filed Jun. 5, 2015.

TECHNICAL FIELD

The present invention relates to an electrical connection box.

BACKGROUND ART

Electrical connection boxes to which wire harnesses of different systems are connected side-by-side are known. JP 4405945B discloses an electrical connection box in which the outlets for a pair of upper and lower wire harnesses are formed by three divided blocks. Out of these three divided blocks, the bottom divided block is formed so as to be integrated with the box main body, and the middle and top divided blocks are formed as independent blocks that are separate from the box main body. The lower wire harness is arranged on the bottom divided block, the middle divided block is placed over the lower wire harness, the upper wire harness is then arranged on the middle divided block, and then the top divided block is laid over the upper wire harness.

JP 4405945B is an example of related art.

Incidentally, in JP 4405945B, the middle and top divided blocks are provided independently from the box main body, thus increasing the number of components and requiring the task of attaching the components, making the attachment task troublesome.

The present invention was achieved in light of the aforementioned situation, and an object thereof is to suppress an increase in the number of components and simplify the attachment task.

SUMMARY OF THE INVENTION

An electrical connection box according to the present invention is an electrical connection box to which a plurality of wire harnesses are connected side-by-side vertically, the electrical connection box includes: a lower case having a lower placement portion on which a lower wire harness out of the plurality of wire harnesses is to be placed; a harness support member having a lower holding portion that is latched to the lower placement portion and holds the lower wire harness, and having an upper placement portion on which an upper wire harness out of the plurality of wire harnesses is to be placed; and an upper case that is mated to the lower case and has an upper holding portion that is latched to the upper placement portion and holds the upper wire harness.

According to this configuration, the upper case has the upper holding portion that latches to the upper placement portion, on which the upper wire harness has been placed, and holds the upper wire harness. Accordingly, compared to the case where a member for holding the upper wire harness is provided separately from the upper case, it is possible to reduce the number of components and also simplify the wire harness attachment task. Accordingly, it is possible to suppress an increase in the number of components and simplify the attachment task.

The following aspect is preferable as an aspect of the present invention. An inclined portion may be formed on a bottom surface of at least one of the upper placement portion and the lower placement portion, and a water cut-off wall that projects from the inclined portion and restricts intrusion of water from the outside may be provided on at least one of the lower placement portion, the lower holding portion, the upper placement portion, and the upper holding portion. According to this configuration, water that has intruded from the outside can be restricted by the water cut-off wall.

A plurality of the water cut-off walls may be provided on at least one of the lower placement portion, the lower holding portion, the upper placement portion, and the upper holding portion, and the plurality of water cut-off walls may be separated with gaps therebetween.

The inclined portion may have a water drainage opening formed so as to pass through. According to this configuration, it is possible for water that has intruded inward of the water cut-off wall to be drained to the outside through the water drainage opening.

The wire harnesses may each be covered by a corrugated tube in which recession portions and protrusion portions are formed alternatingly, and a tip portion of the water cut-off wall may abut against an outer periphery of a corrugated tube among the corrugated tubes. According to this configuration, the positions of the wire harnesses can be held by the water cut-off walls.

According to the present invention, it is possible to suppress an increase in the number of parts and simplify the attachment task.

EMBODIMENTS OF THE INVENTION

Figure 1:
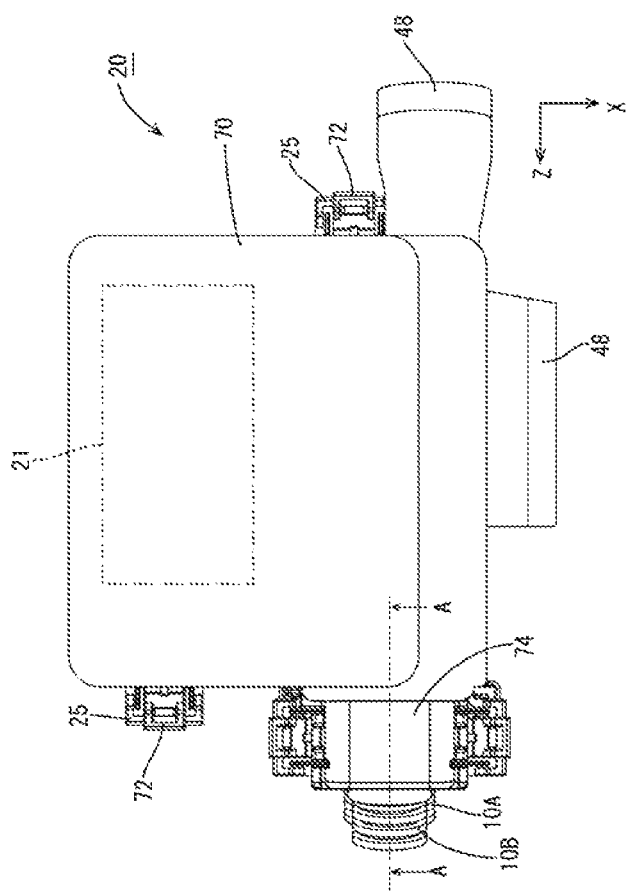
FIG. 1 is a plan view of an electrical connection box to which a pair of upper and lower wire harnesses are connected, according to a first embodiment.
Figure 2:
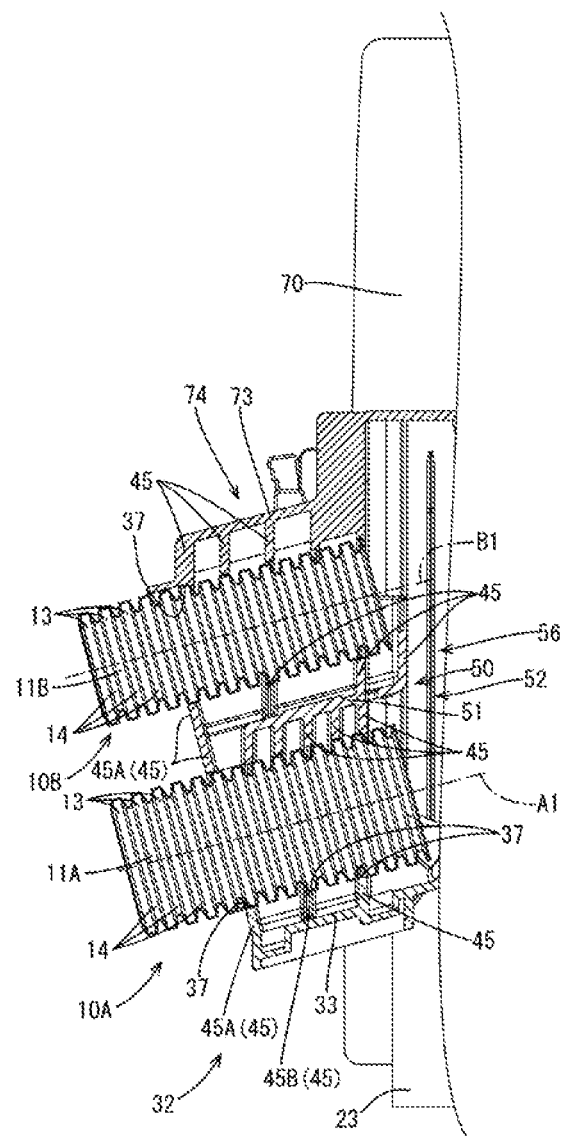
FIG. 2 is a cross-sectional view taken along A-A in FIG. 1.
Figure 3:
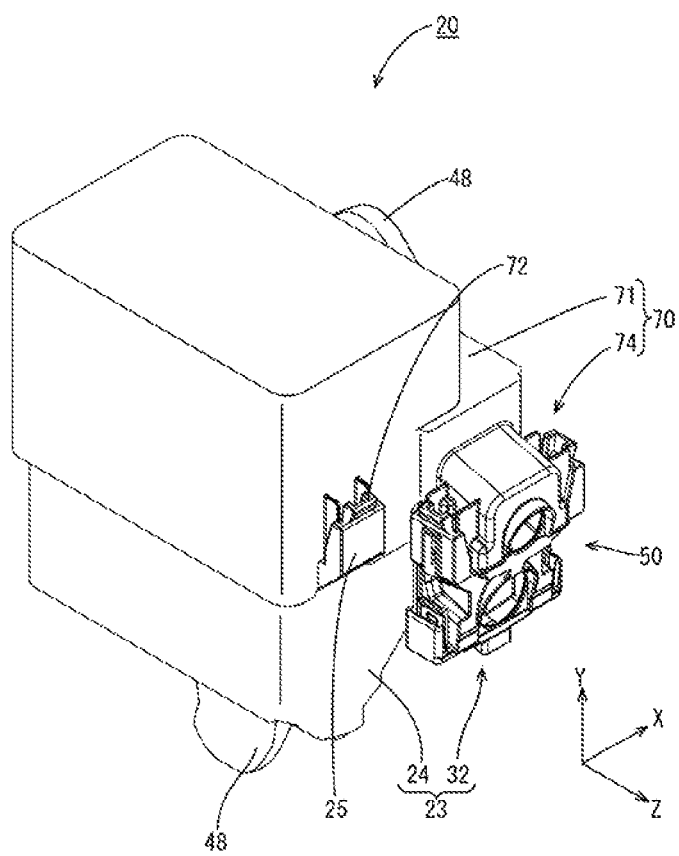
FIG. 3 is a perspective view of the electrical connection box.
Figure 4:
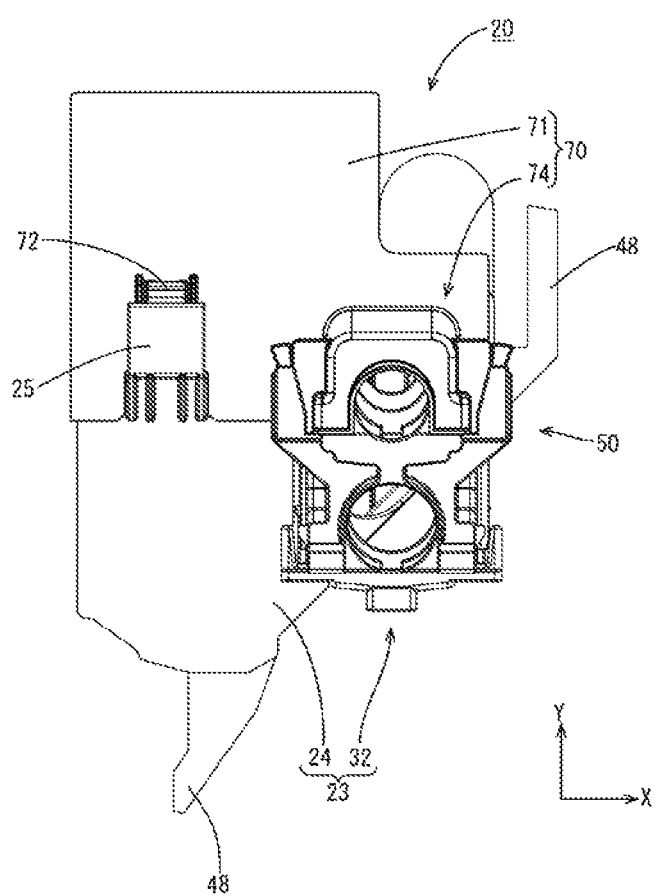
FIG. 4 is a front view of the electrical connection box.
Figure 5:
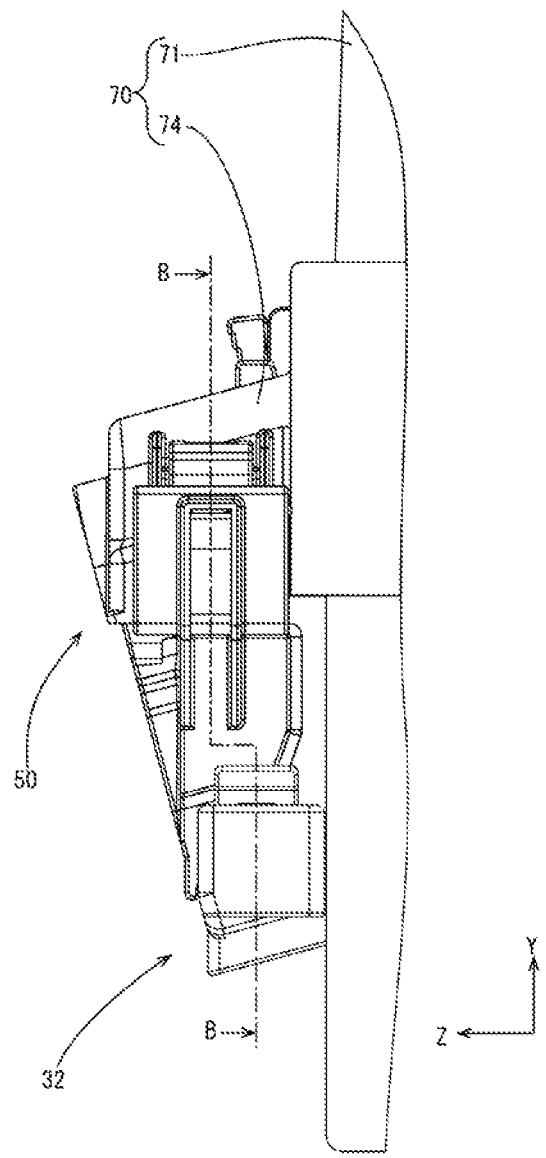
FIG. 5 is a right side view showing a partial enlargement of the electrical connection box.
Figure 6:
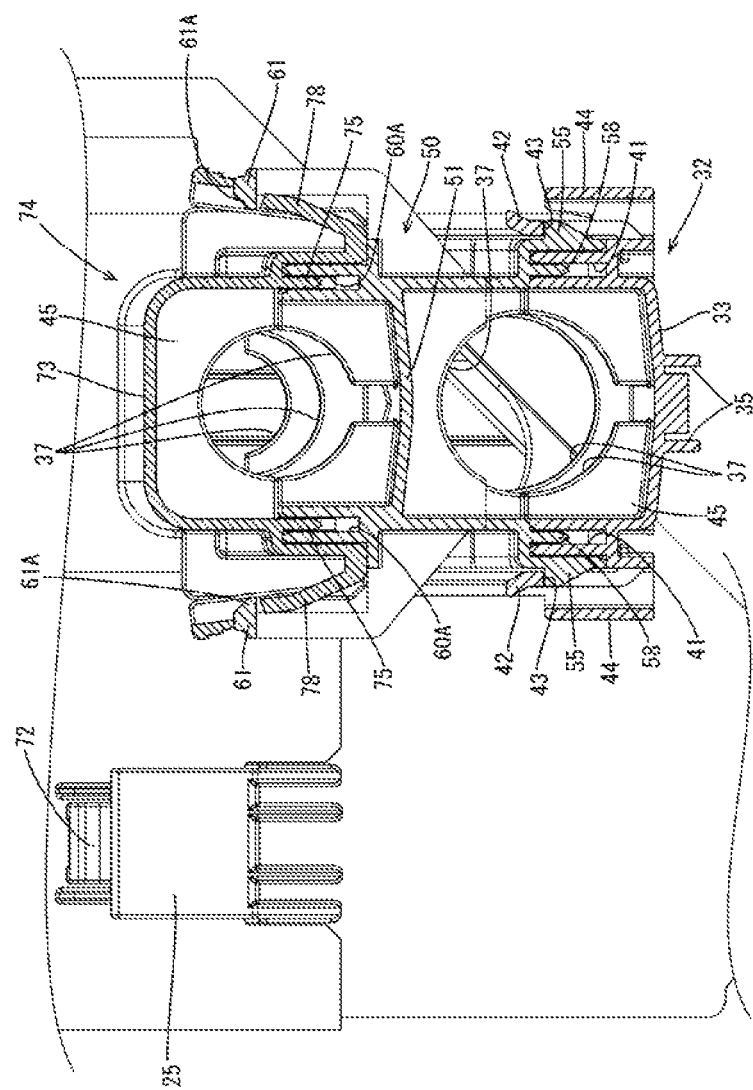
FIG. 6 is a cross-sectional view taken along B-B in FIG. 5.
Figure 7:
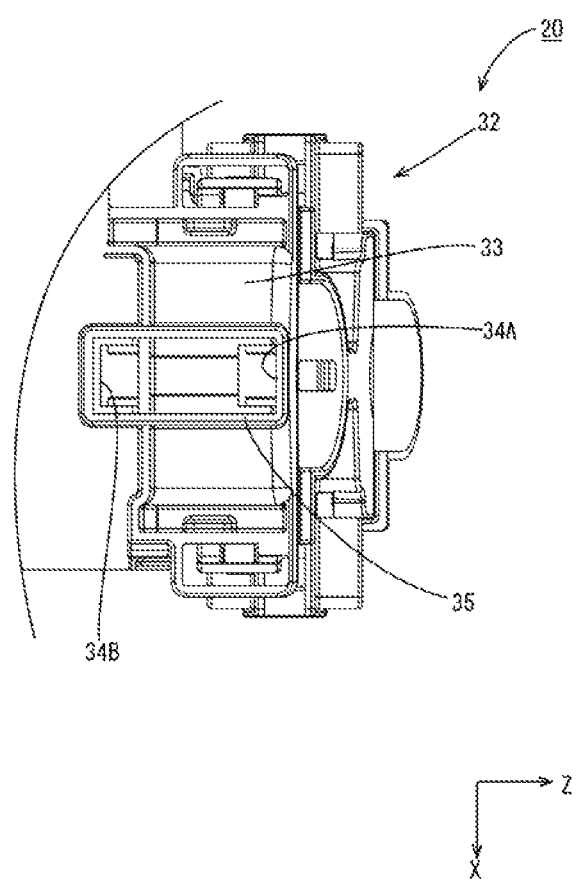
FIG. 7 is a bottom view showing a partial enlargement of the electrical connection box.

First Embodiment. An electrical connection box 20 according to a first embodiment will be described below with reference to FIGS. 1 to 24. The electrical connection box 20 of the present embodiment is mounted in a pathway between a power supply such as a battery and a load such as an in-vehicle electrical component or a motor in a vehicle such as an electric automobile or a hybrid automobile, and the terminal portions of a pair of upper and lower wire harnesses 10A and 10B are connected to the electrical connection box 20. In the following description, the X direction in FIG. 3 is the rightward direction, the Y direction is the upward direction, and the Z direction is the forward direction.

Wire harnesses 10A, 10B. The wire harnesses 10A and 10B are connected to different systems in the vehicle, and as shown in FIG. 2, the terminal portions thereof are connected to the electrical connection box 20 side-by-side vertically. In the present embodiment, the lower wire harness 10A (a corrugated tube 11A thereof) has a larger outer diameter than the upper wire harness 10B (a corrugated tube 11B thereof). Note that the widths of the upper and lower wire harnesses 10B and 10A are not limited to this, and the upper wire harness 10B may have a larger outer diameter, or the upper and lower wire harnesses 10A may have the same outer diameter.

The wire harnesses 10A and 10B respectively include multiple electrical wires (not shown) and the corrugated tubes 11A and 11B that encompass the group of electrical wires therein. The electrical wires are each a covered wire in which an insulation layer encompasses a conductor portion made up of, for example, a single-core wire or a stranded wire in which metal strands are twisted together. The corrugated tubes 11A and 11B are made of an insulating synthetic resin, and are formed with a wave shape in which protrusion portions 13, which protrude in the diameter direction in the shape of rings, and recession portions 14, which are ring-shaped and have a smaller outer diameter than the protrusion portions 13, alternate with each other in the axial direction.

Electrical connection box 20. The electrical connection box 20 houses a circuit portion 21 (see FIG. 1) therein, and as shown in FIG. 3, includes a lower case 23, an upper case 70 that is mated to the lower case 23, and a harness support member 50 that supports the upper and lower wire harnesses 10A and 10B between them. The circuit portion 21 includes a circuit board and electrical components such as coils, capacitors, and relays implemented on the circuit board. The circuit portion 21 can, for example, be made up of multiple circuit units that are covered by an inner case made of a synthetic resin (not shown) and are housed between the lower case 23 and the upper case 70.

Figure 10:
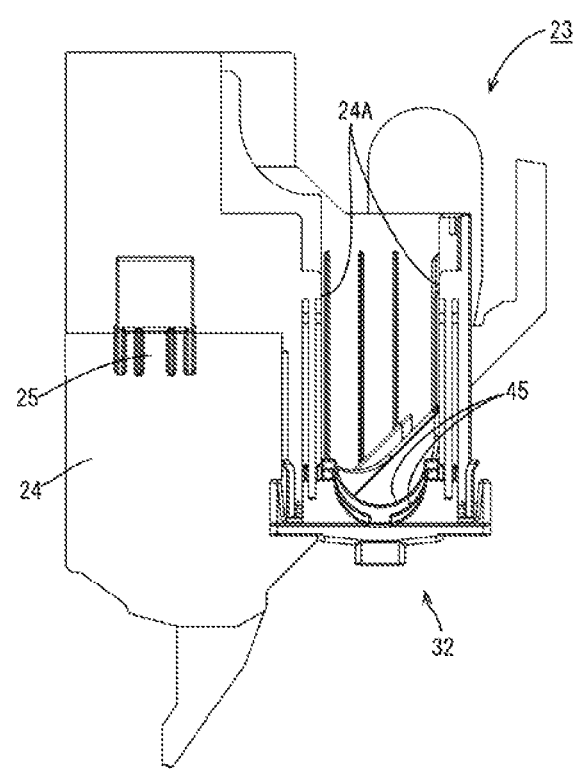
FIG. 10 is a front view of the lower case.

Lower case 23. The lower case 23 is made of an insulating synthetic resin, and includes a lower case main body 24, a lower placement portion 32 on which the lower wire harness 10A is placed, and multiple attachment portions 48 for attachment to the vehicle (the shapes of the attachment portions 48 are shown schematically in FIG. 3 and the like). As schematically shown in FIG. 10, the lower case main body 24 is shaped as a box having a rectangular opening on the upper side, and the upper portion of the lower case main body 24 is mated to the upper case 70.

Figure 8:
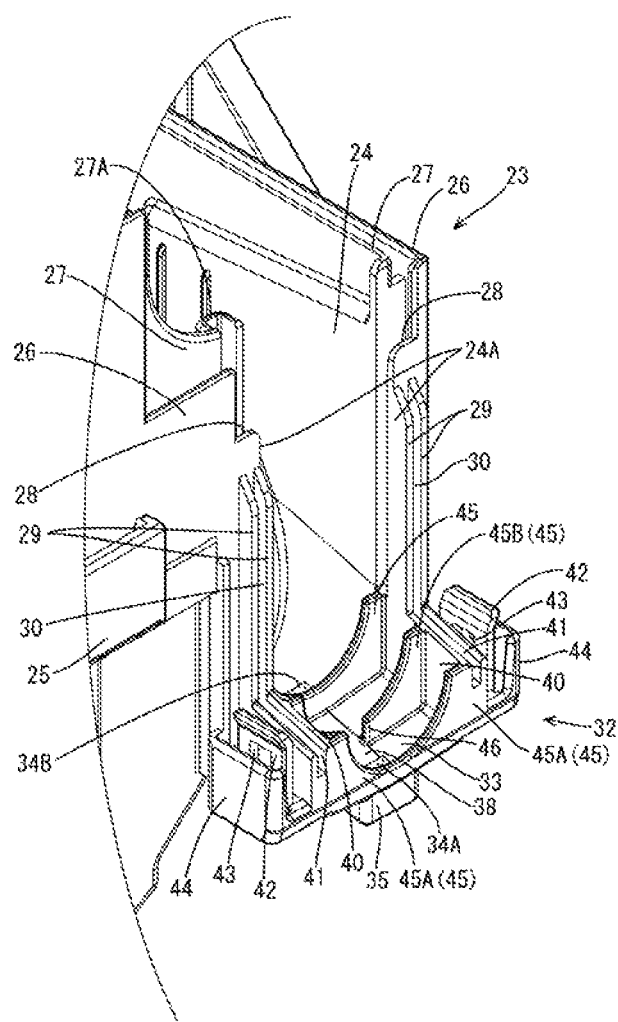
FIG. 8 is a perspective view showing a partial enlargement of a lower case.

As shown in FIG. 8, the lower case main body 24 has a groove-like insertion recession portion 24A formed by cutting out a portion of the front-side wall, and the insertion recession portion 24A extends in the up-down direction. The insertion recession portion 24A is open at the upper end, and the lower end portion is closed by a rear water cut-off wall 45 of the lower placement portion 32. Out of the walls that surround the lower case main body 24, at least the wall on the insertion recession portion 24A side is a double wall made up of an outer wall 26 that faces outward and an inner wall 27 inward thereof. The inner wall 27 adjacent to the insertion recession portion 24A on the left side is constituted by a folded portion 27A that is folded into a U shape. The end portions of the outer wall 26 and the inner wall 27 on the insertion recession portion 24A side are constituted by first slide groove portions 28 into which projection portions 63 of the harness support member 50 are slidably inserted.

A pair of slide projection portions 29 extend in the up-down direction on the front surface of each of two portions of the front wall (the outer wall 26 thereof) of the lower case main body 24, specifically the two portions on respective sides of the insertion recession portion 24A. The space between each pair of slide projection portions 29 forms a second slide groove portion 30 in which a slide contact portion 64 of the harness support member 50 slides. A pair of case latch receiver portions 25 are respectively provided on the front wall and the rear wall of the lower case main body 24. The case latch receiver portions 25 are latched by case latching portions 72 of the upper case 70 and hold the lower case 23 and the upper case 70 in the mated state.

Figure 9:
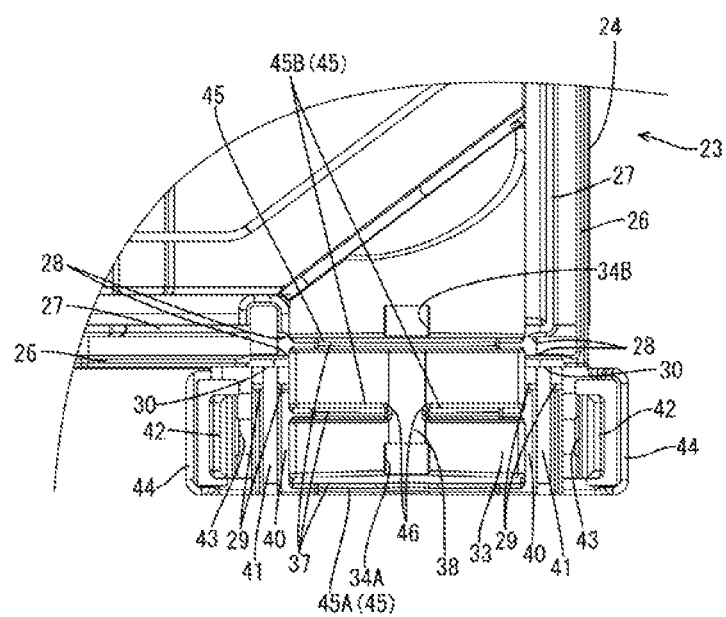
FIG. 9 is a plan view showing a partial enlargement of the lower case.

Lower placement portion 32. As shown in FIGS. 8 and 9, the lower placement portion 32 includes an inclined portion 33 that is inclined along the wire harness 10A, multiple (three along the front-rear direction in the present embodiment) water cut-off walls 45 that rise up from the inclined portion 33, and side wall portions 40 that rise up from the inclined portion 33 and respectively connect the left and right end portions of the water cut-off walls 45. The inclined portion 33 is shaped as a plate, and is arranged so as to oppose the outer peripheral surface of the wire harness 10A, and is inclined in the front-back direction such that the front side is lower. The inclined portion 33 is inclined in the left-right direction such that the intermediate portion side is lower, and a flat intermediate portion serves as a water drainage path 38. The water drainage path 38 forms a notch portion 46 that has been cut out so as to horizontally divide the intermediate portion, with respect to the width direction, of a middle water cut-off wall 45B among the three water cut-off walls 45.

A water drainage opening 34A that passes through the inclined portion 33 in the up-down direction is formed in the front end portion (lower end portion) of the water drainage path 38. Note that a water drainage opening 34B that passes through the bottom face of the lower case main body 24 in the up-down direction is also formed in the lower placement portion 32 at a position rearward of the rear water cut-off wall 45. A water drainage tube portion 35 that is in communication with the water drainage openings 34A and 34B is formed on the bottom surface side of the lower placement portion 32. Water that passes through the water drainage openings 34A and 34B is drained via the water drainage tube portion 35.

The water cut-off walls 45 of the lower placement portion 32 are formed with spaces therebetween in the front-rear direction, and each water cut-off wall 45 is formed so as to span the entire width of the upper surface of the inclined portion 33. As shown in FIG. 2, a front water cut-off wall 45A of the inclined portion 33 projects in a direction orthogonal to an axial direction Al of the wire harness 10A, and the water cut-off walls 45 other than the front one project perpendicularly upward relative to the horizontal direction (i.e., project in a direction inclined relative to the direction orthogonal to the axial direction). The water cut-off walls 45 each include an arc-shaped mating portion 37 at the upper end. The mating portions 37 are hemispherical and abut against the outer periphery of the corrugated tube 11A.

As shown in FIG. 8, the upper end portion of each of the side wall portions 40 is provided with an insertion groove 41 that is in communication with the second slide groove portion 30. Insertion pieces 58 of the harness support member 50 are inserted into the insertion grooves 41, and thus the harness support member 50 is guided to a regular position. A lower latch receiving portion 42 that is to be latched to the harness support member 50 is provided on the outer side of each of the side wall portions 40. The lower latch receiving portions 42 extend outward from the lower portions of the side wall portions 40, are shaped as frames that can undergo flexing deformation, and are provided with rectangular latching holes 43 that pass through them. A protection wall 44 extends from the lower portion of each the side wall portions 40 at a position outward of the lower latch receiving portion 42.

Figure 11:
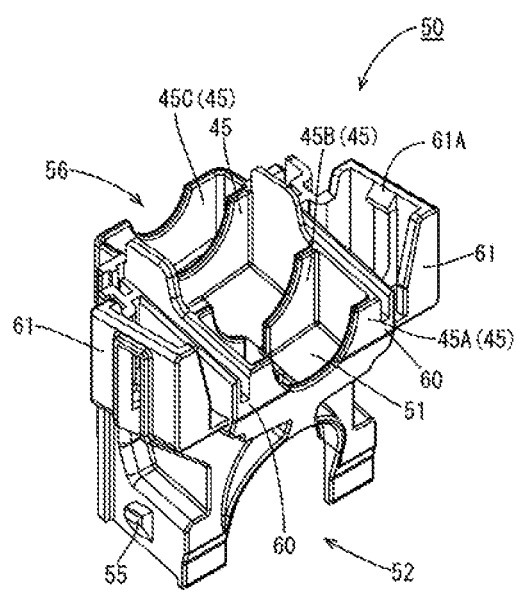
FIG. 11 is a perspective view of a harness support member.
Figure 12:
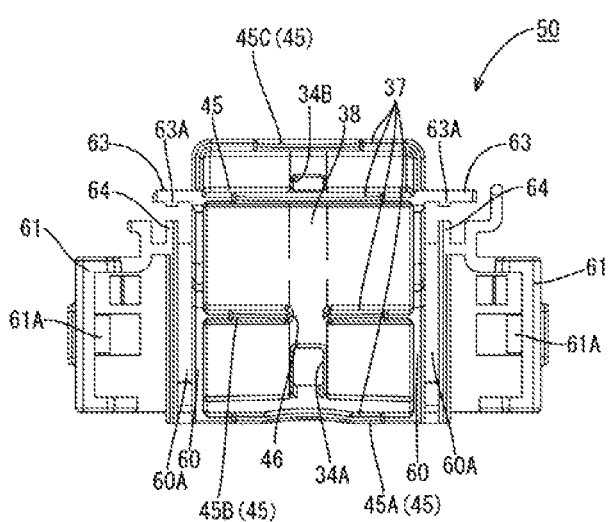
FIG. 12 is a plan view of the harness support member.

Harness support member 50. The harness support member 50 is made of an insulating synthetic resin, and as shown in FIGS. 11 and 12, and includes a lower holding portion 52 that holds the lower wire harness 10A and an upper placement portion 56 on which the upper wire harness 10B is placed. An inclined portion 51 that is inclined along the wire harnesses 10A and 10B is provided at the boundary between the lower holding portion 52 and the upper placement portion 56.

Lower holding portion 52. The lower holding portion 52 includes multiple water cut-off walls 45 that project downward from the inclined portion 51. The inclined portion 51 is shaped as a plate, opposes the outer peripheral surface of the wire harness 10A, and is inclined in the front-back direction such that the front side is lower. The inclined portion 51 is inclined in the left-right direction such that the intermediate portion side is lower, and a flat intermediate portion on the upper surface side serves as a water drainage path 38. A water drainage opening 34A is formed in the lower end portion of the water drainage path 38. The water drainage opening 34A passes through the inclined portion 51 in the up-down direction. Note that a water drainage opening 34B that passes through the inclined portion 51 is also formed in the inclined portion 51 at a position rearward of the rear water cut-off wall 45.

Figure 13:
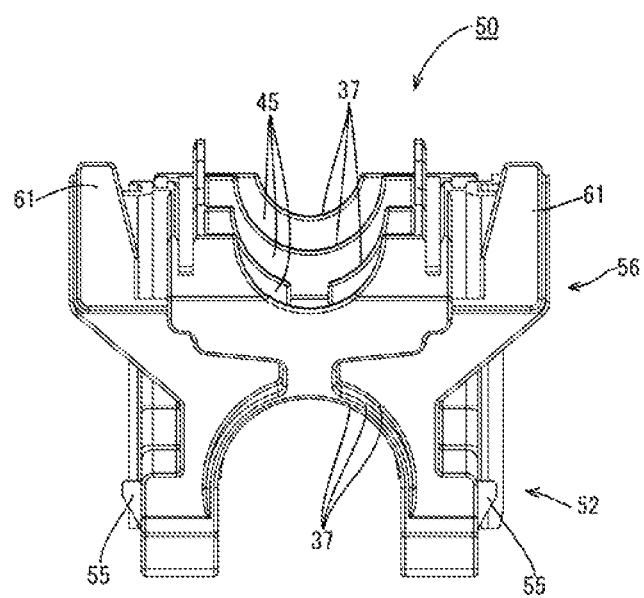
FIG. 13 is a front view of the harness support member.
Figure 14:
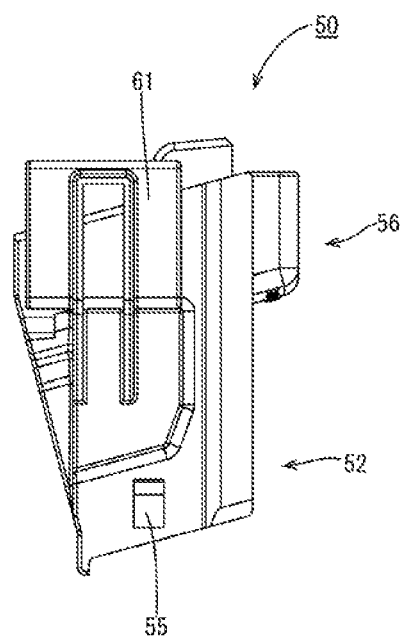
FIG. 14 is a right side view of the harness support member.
Figure 15:
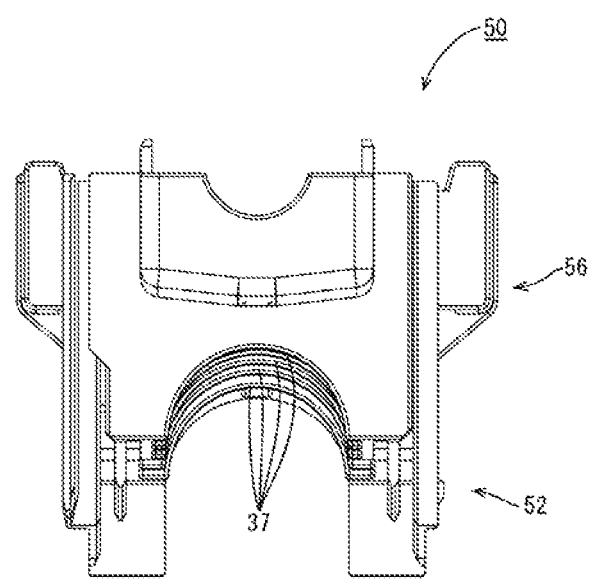
FIG. 15 is a rear view of the harness support member.
Figure 16:
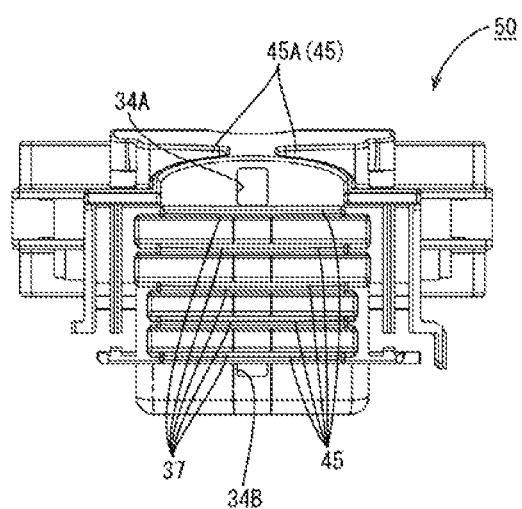
FIG. 16 is a bottom view of the harness support member.

As shown in FIG. 16, six water cut-off walls 45 are formed with spaces therebetween in the front-rear direction (so as to be separated with gaps therebetween). A front water cut-off wall 45A of the inclined portion 51 projects in a direction orthogonal to the axial direction Al of the wire harness 10A, and the water cut-off walls 45 other than the front one project perpendicularly downward relative to the horizontal direction. The water cut-off walls 45 each include an arc-shaped mating portion 37. As shown in FIG. 13, lower latching portions 55 that latch to the lower latch receiving portions 42 of the lower placement portion 32 respectively project from side surfaces of the lower holding portion 52.

Upper placement portion 56. As shown in FIG. 11, the upper placement portion 56 includes multiple water cut-off walls 45 that rise upward from the inclined portion 51 formed as the bottom face, and side wall portions 60 that rise up from the inclined portion 51 and respectively connect the left and right end portions of the water cut-off walls 45. Four water cut-off walls 45 are formed on the upper placement portion 56 with spaces therebetween in the front-rear direction (so as to be separated with gaps therebetween). A front water cut-off wall 45A of the inclined portion 51 projects in a direction orthogonal to the axial direction of the wire harness 10B, and the water cut-off walls 45 other than the front one project perpendicularly upward relative to the horizontal direction. A rear water cut-off wall 45C is formed so as to be taller than the other water cut-off walls 45, and is arranged rearward of the rear end of the corrugated tube 11B. As shown in FIG. 12, the water cut-off walls 45 each include an arc-shaped mating portion 37. The mating portions 37 abut against the outer peripheral surface of the corrugated tube 11B. A notch portion 46 is cut out from the intermediate portion, with respect to the width direction, of a second water cut-off wall 45B from the front in order to form a water drainage path 38.

An insertion groove 60A is formed in the upper end portion of each of the side wall portions 60. Insertion pieces 75 of the upper case 70 are inserted into and guided by the insertion grooves 60A. Upper latch receiving portions 61 that are latched to an upper holding portion 74 of the upper case 70 are respectively provided on the outer sides of the side wall portions 60. The upper latch receiving portions 61 extend outward of the side wall portions 60, and latching projection portions 61A project inward.

The back surface side of the harness support member 50 is provided with a pair of left and right projection portions 63 that project laterally and slide contact portions 64 for insertion into the first slide groove portions 28. The projection portions 63 are plate-shaped and project laterally from one of the water cut-off walls 45 in a direction along the water cut-off wall 45. Projection parts 63A extend in the up-down direction on the front surfaces of the projection portions 63. The slide contact portions 64 are plate-shaped and project rearward from the rear end portions of the side wall portions 60.

Figure 17:
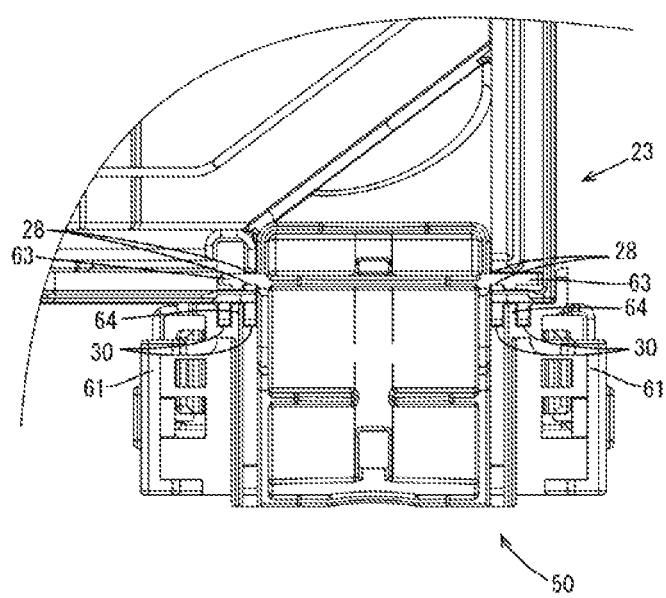
FIG. 17 is a plan view showing a partial enlargement in the attachment of the harness support member to the lower case.
Figure 18:
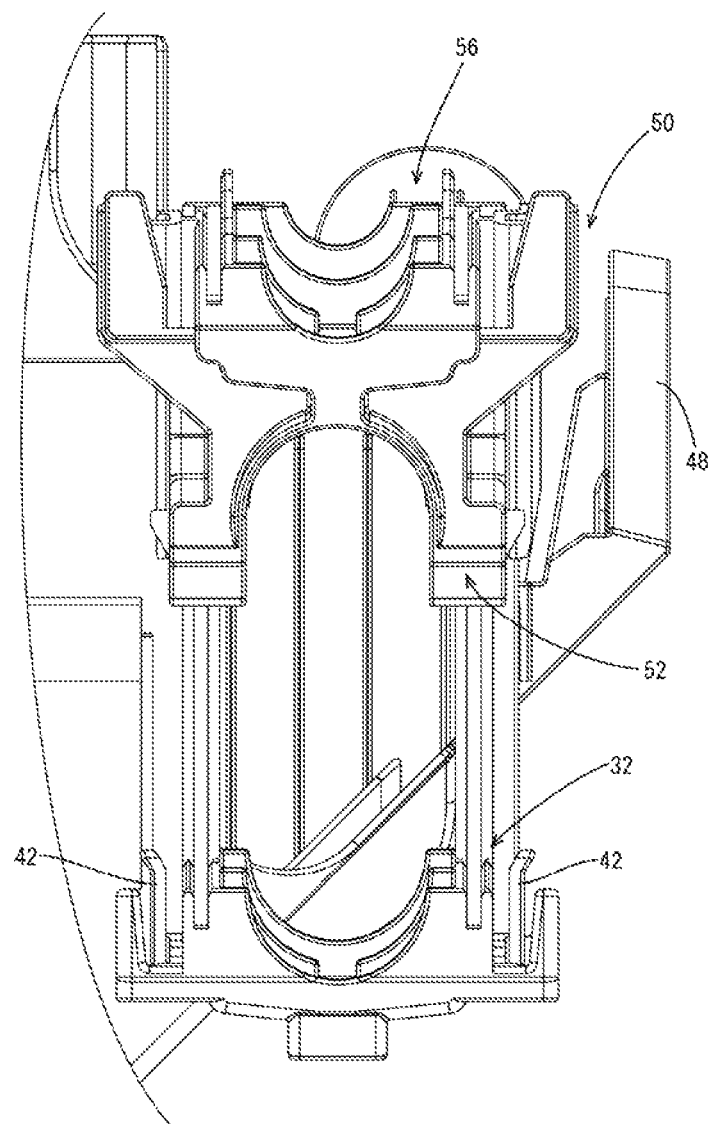
FIG. 18 is a front view showing a partial enlargement in the attachment of the harness support member to the lower case.
Figure 19:
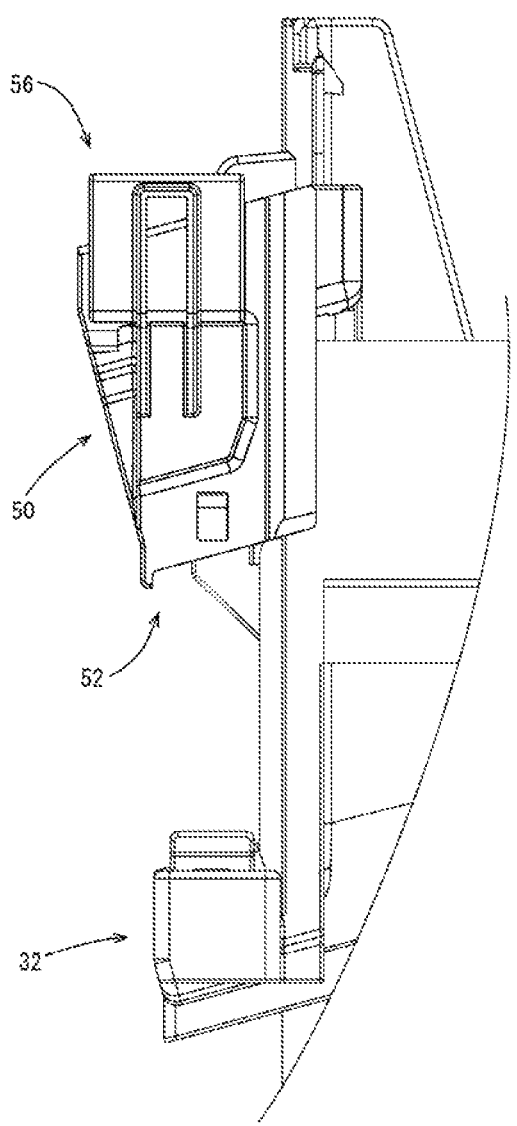
FIG. 19 is a right side view showing a partial enlargement in the attachment of the harness support member to the lower case.
Figure 20:
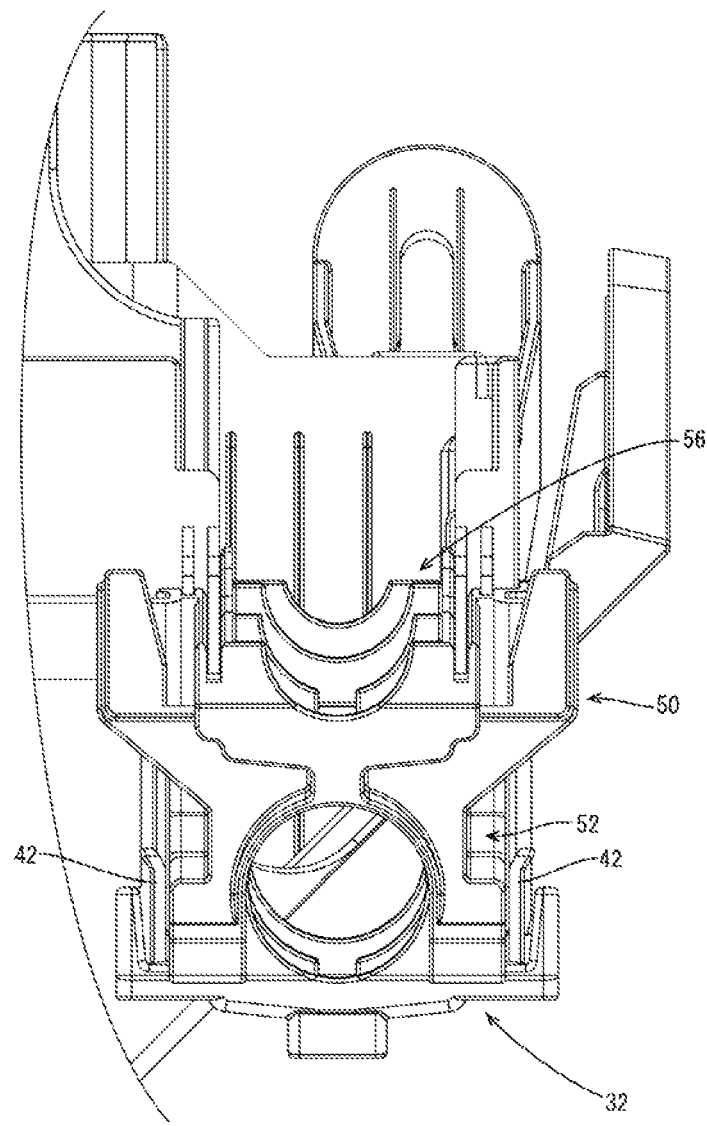
FIG. 20 is a front view showing a partial enlargement of a state in which the harness support member has been attached to the lower case.
Figure 21:
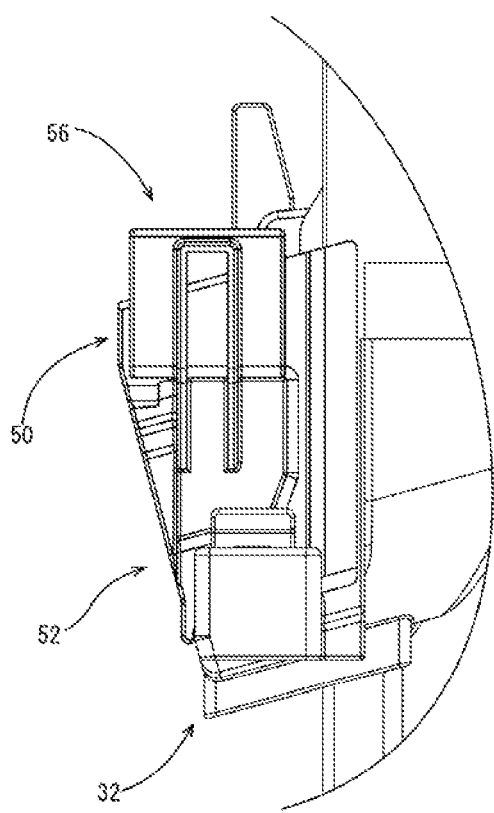
FIG. 21 is a right side view showing a partial enlargement of a state in which the harness support member has been attached to the lower case.

The harness support member 50 is attached to the lower case 23 by, as shown in FIG. 17, inserting the projection portions 63 into the first slide groove portions 28 and inserting the slide contact portions 64 into the second slide groove portions 30 (FIGS. 18 and 19). Then, when the harness support member 50 is slid downward and the lower holding portion 52 reaches the position for mating with the lower placement portion 32, the lower latch receiving portions 42 become latched to the lower latching portions 55, and the upper wire harness 10A can be placed on the upper placement portion 56 (FIGS. 20 and 21).

Figure 22:
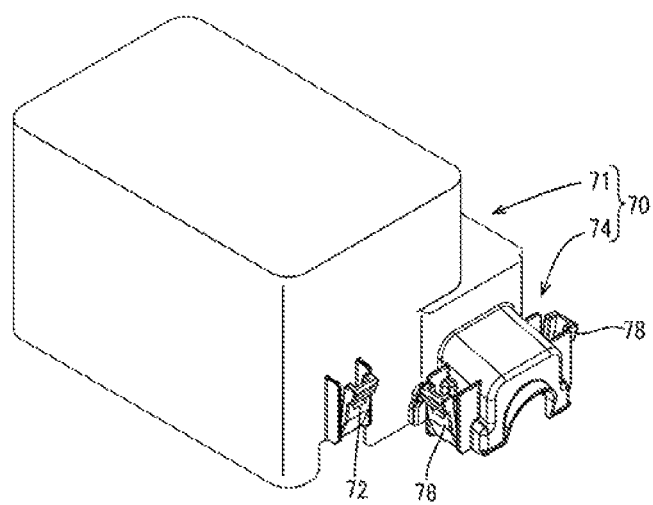
FIG. 22 is a perspective view of an upper case.
Figure 23:
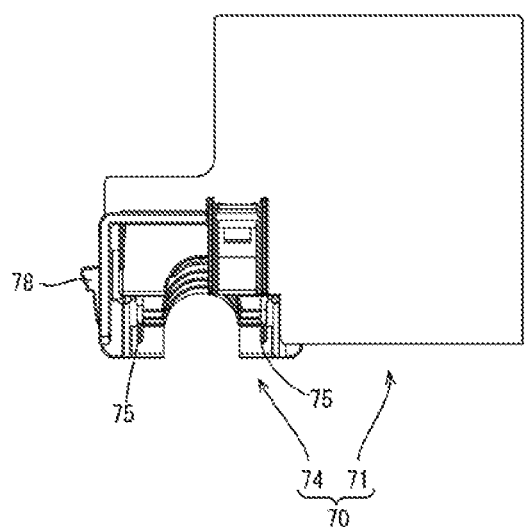
FIG. 23 is a rear view of the upper case.

Upper case 70. The upper case 70 is made of an insulating synthetic resin, and as shown in FIG. 22, includes an upper case main body 71 and an upper holding portion 74 that is placed over the upper wire harness 10B. As schematically shown in FIG. 22, the upper case main body 71 is shaped as a box having a rectangular opening on the lower side, and case latching portions 72 are provided on the outer surface.

Figure 24:
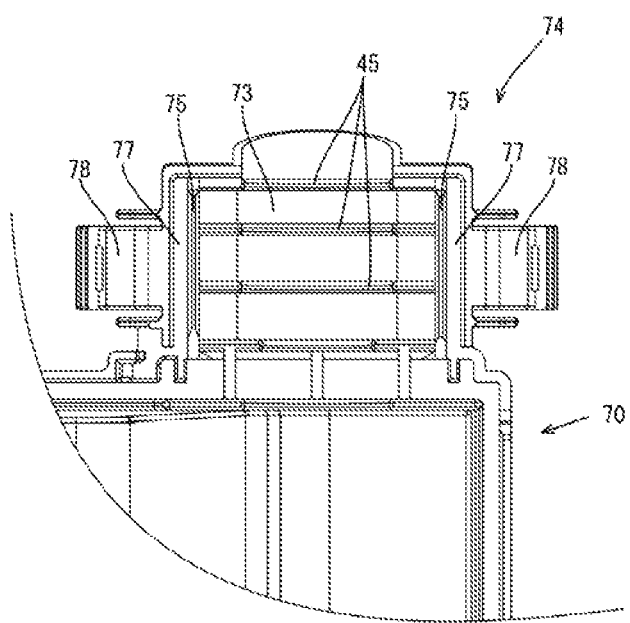
FIG. 24 is a bottom view showing a partial enlargement of the upper case.

Upper holding portion 74. As shown in FIG. 24, the upper holding portion 74 includes an inclined portion 73 that extends along the wire harness 10B, multiple water cut-off walls 45 that project downward from the inclined portion 73, and side wall portions 77 that project downward from the inclined portion 73 and respectively connect left and right end portions of the water cut-off walls 45. The inclined portion 73 is shaped as a plate and opposes the outer peripheral surface of the wire harness 10B with a space therebetween. The water cut-off walls 45 are formed with spaces therebetween in the front-rear direction, and project perpendicularly downward relative to the horizontal direction. The tips of the water cut-off walls 45 are each an arc-shaped mating portion 37. The mating portions 37 are hemispherical and abut against the outer peripheral surfaces of the corrugated tubes 11A and 11B.

Insertion pieces 75 that are guided by the insertion grooves 60A respectively project downward from the lower ends of the side wall portions 77. Upper latching portions 78 for latching to the upper latch receiving portions 61 are respectively provided on the outer sides of the side wall portions 77. The upper latching portions 78 are shaped as plates that can undergo flexing deformation, and when they latch to the latching projection portions 61A of the upper latch receiving portions 61, the upper placement portion 56 and the upper holding portion 74 are mated together so as to hold the wire harness 10B.

The present embodiment has actions and effects such as the following. According to the present embodiment, the lower wire harness 10A is placed on the lower placement portion 32 of the lower case 23, and the lower holding portion 52 of the harness support member 50 latches to the lower placement portion 32, thus holding the wire harness 10A. Also, the upper case 70 that is mated with the lower case 23 has the upper holding portion 74 that holds the upper wire harness 10B by latching to the upper placement portion 56 on which the upper wire harness 10B has been placed. Accordingly, compared to the case where a member for holding the upper wire harness 10B is provided separately from the upper case 70, it is possible to reduce the number of components and also simplify the task for attaching the wire harnesses 10A and 10B. Accordingly, it is possible to suppress an increase in the number of components and simplify the attachment task.

Also, the bottom surface of at least one out of the upper placement portion 56 and the lower placement portion 32 is provided with the inclined portion 33, 51, or 73, and includes water cut-off walls 45 (45A to 45C) that project from the inclined portion 33, 51, or 73 and restrict the intrusion of water from the outside. According to this configuration, water can be guided to the outside by the inclination of the inclined portion 33, 51, or 73, and the intrusion of water from the outside can be restricted by the water cut-off walls 45.

Also, a water drainage path 38 formed by cutting out a portion of a water cut-off wall 45 is provided on the lower placement portion 32, the lower holding portion 52, the upper placement portion 56, and the upper holding portion 74 (or at least one of them). According to this configuration, it is possible for water that has intruded inward of the water cut-off wall 45 to be drained to the outside through the water drainage path 38.

Also, the inclined portions 33 and 51 have the water drainage openings 34A formed so as to pass through them. According to this configuration, it is possible for water that has intruded inward of the water cut-off wall 45 to be drained to the outside through the water drainage openings 34A.

Also, the wire harnesses 10A and 10B are covered by the corrugated tubes 11A and 11B in which recession portions 14 and protrusion portions 13 are formed alternatingly, and the mating portions 37 (tip portions) of the water cut-off walls 45 abut against the outer periphery of the corrugated tubes 11A and 11B. According to this configuration, the positions of the wire harnesses 10A and 10B can be held by the corrugated tubes 11A and 11B and the water cut-off walls 45.

Second Embodiment. A second embodiment will be described below with reference to FIG. 25.

Figure 25:
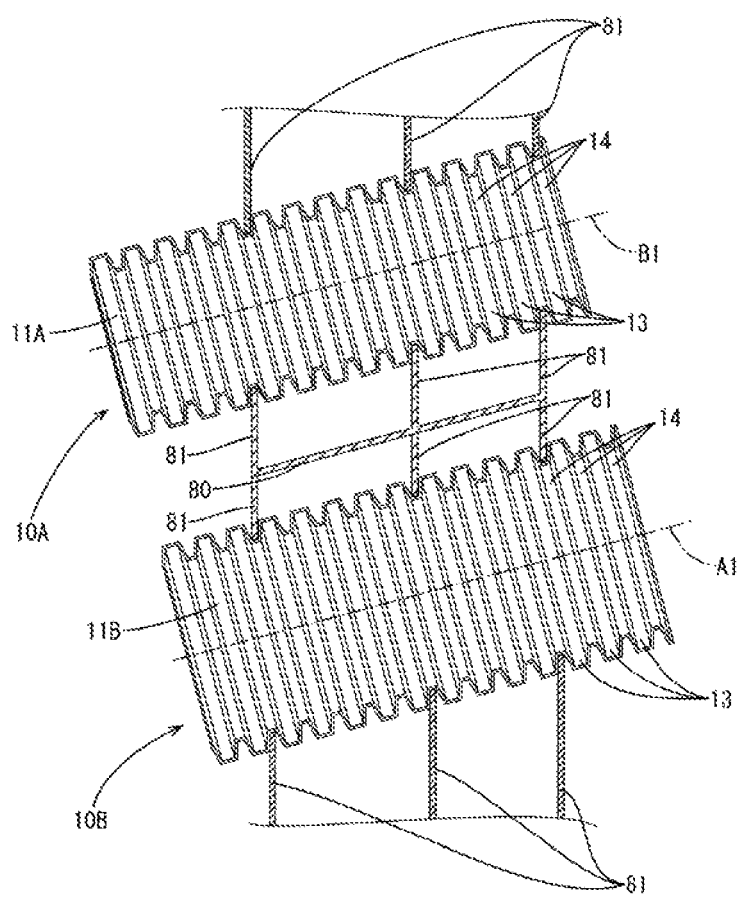
FIG. 25 is a cross-sectional view of a state in which a pair of upper and lower wire harnesses have been positioned by water cut-off walls, according to a second embodiment.

As shown in FIG. 25, in the second embodiment, multiple water cut-off walls 81 project from inclined portions 80 that extend along the wire harnesses 10A and 10B, and the tip portions of the water cut-off walls 81 enter the space inside recession portions 14 of the corrugated tubes 11A and 11B. Other aspects are the same as in the first embodiment and therefore will not be described here. The thickness of the water cut-off walls 81 is less than the width (width in the axial direction) of the recession portions 14, and the distance between the water cut-off walls 81 is set according to the positions of the recession portions 14. According to the second embodiment, recession portions 14 of the corrugated tubes 11A and 11B are latched by the water cut-off walls 81 so as to resist force in the direction of disconnection of the wire harnesses 10A and 10B, thus restricting disconnection of the wire harnesses 10A and 10B.

Other Embodiments.

The present invention is not limited to the embodiments described above using the foregoing description and drawings, and embodiments such as the following are also encompassed in the technical scope of the present invention.

(1) Although the pair of upper and lower wire harnesses 10A and 10B are described in the above embodiments, three or more wire harnesses may be provided. In this case, multiple harness support members 50 may be provided, for example.

(2) Although the wire harnesses 10A and 10B respectively include the corrugated tubes 11A and 11B in the above embodiments, a configuration is possible in which they do not include the corrugated tubes 11A and 11B, and the wire harnesses 10A and 10B are constituted by one or more electrical wires.

(3) Although the water cut-off walls 45 and the water drainage paths 38 are provided on the lower placement portion 32, the lower holding portion 52, the upper placement portion 56, and the upper holding portion 74 in the above embodiments, they may be provided on at least one among such members. Also, although the water drainage opening 34A is provided in both the lower placement portion 32 and the upper placement portion 56, it may be provided in at least one out of such members.

What is claimed is:

1. An electrical connection box to which a plurality of wire harnesses are connected side-by-side vertically, the electrical connection box comprising:

a lower case having a lower placement portion on which a lower wire harness out of the plurality of wire harnesses is to be placed;

a harness support member having a lower holding portion that is latched to the lower placement portion and holds the lower wire harness, and having an upper placement portion on which an upper wire harness out of the plurality of wire harnesses is to be placed; and an upper case that is mated to the lower case and has an upper holding portion that is latched to the upper placement portion and holds the upper wire harness, wherein an inclined portion is formed on a bottom surface of at least one out of the upper placement portion and the lower placement portion and a plurality of the water cut-off walls projects from the inclined portion, and the plurality of water cut-off walls are separated with gaps therebetween, and wherein the inclined portion has a water drainage opening formed so as to pass through.

2. The electrical connection box according to claim 1, wherein the wire harnesses are each covered by a corrugated tube in which recession portions and protrusion portions are formed alternatingly, and a tip portion of the water cut-off wall abuts against an outer periphery of a corrugated tube among the corrugated tubes.

3. The electrical connection box according to claim 1, wherein the inclined portion has a water drainage opening formed so as to pass through.

\* \* \* \* \*